United States Patent [19]
Kawanobe

[11] Patent Number: 6,087,794
[45] Date of Patent: Jul. 11, 2000

[54] AUTOMATIC OPEN-AND-CLOSE SYSTEM FOR A VEHICLE SLIDE DOOR

[75] Inventor: Osamu Kawanobe, Kanagawa, Japan

[73] Assignee: Ohi Seisakusho Co., Ltd., Yokohama, Japan

[21] Appl. No.: 09/016,340

[22] Filed: Jan. 30, 1998

[30] Foreign Application Priority Data

Jan. 30, 1997 [JP] Japan ..................... 9-029853

[51] Int. Cl.⁷ ........................................ G05B 5/00
[52] U.S. Cl. .................... 318/446; 318/466; 318/478; 49/360
[58] Field of Search ..................... 318/445–466, 318/467–470, 478–479, 280, 283, 226; 49/360–363, 31, 280

[56] References Cited

U.S. PATENT DOCUMENTS 5,239,779  8/1993  DeLand et al. ..................... 49/360
5,525,875  6/1996  Nakamura et al. .................. 318/266
5,625,266  4/1997  Stark ................................... 318/466

FOREIGN PATENT DOCUMENTS 0 626 498  11/1994  European Pat. Off. .

*Primary Examiner*—David Martin
*Attorney, Agent, or Firm*—Foley & Lardner

[57] ABSTRACT

An automatic open-and-close system for a vehicle slide door includes a slide door being moved for its opening/closing along a guide track provided on a vehicle body by a slide door moving mechanism, a clutch device for intermittently transmitting a power from a drive source to a slide door moving mechanism, a controller for intermittently controlling the clutch device, and a select circuit for forcibly operating the clutch device when a vehicle engine stops by applying a power source voltage to the clutch device.

9 Claims, 8 Drawing Sheets

AUTOMATIC OPEN-AND-CLOSE SYSTEM FOR A VEHICLE SLIDE DOOR

BACKGROUND OF THE INVENTION

1. Field of the Invention

The present invention relates to an automatic open-and-close system for a vehicle slide door which transmits a drive force from a drive source to a slide door through an electromagnetic clutch to move the slide door for its opening/closing.

2. Description of the Related Art

There is known a control system for automatically opening and closing, by use of a drive source, e.g., a motor, a slide door which is mounted on the side of a vehicle body while being slidable in the lengthwise direction. To drive the slide door for its opening/closing, suitable operation means is located near the driver seat or the door handle, and the occupant intentionally operates the operation means.

When a vehicle stops at a sloped road, the automatic open-and-close system controls, by the controller contained therein, a power transmission maintenance force of the electromagnetic clutch, which is located between the drive source and the slide door, so as to inhibit the slide door from moving or to allow a manual operation for opening/closing the door.

The conventional system suffers from the following problems. The performances of the battery for supplying electric power to the controller are degraded by aging or other causes. When the engine of the vehicle carrying such a battery is started up, the output voltage of the battery will decrease, so that it fails to drive the controller. Where the controller is inoperative, the electromagnetic clutch is put in an off state, and the slide door moves down by its weight when the vehicle stops on the sloped road.

In the automatic open-and-close system using a microcomputer for the controller, when the power voltage drops, the microcomputer is reset in order to prevent the microcomputer from operating uncontrollably. Also in a case where the battery voltage is decreased below its normal voltage but it is high enough for the clutch to hold the slide door, the microcomputer is reset. The controller is inoperative and the electromagnetic clutch will be disengaged.

Some of those known systems are designed such that when the battery voltage drops to below a predetermined voltage, the systems automatically stop their operations. Each system monitors the battery voltage when no load is connected to the battery. The battery, although its performances are degraded, apparently produces a voltage approximate to the normal voltage because of its nature. In a case where the battery voltage drops after the slide door is driven, and the engine is started up when the slide door is moving, the battery voltage drops upon the starting up of the engine and the controller is reset.

SUMMARY OF THE INVENTION

For the above background reasons, the present invention has an object to provide an automatic open-and-close system for a vehicle slide door which can hold the side door at a fixed position even when the battery voltage drops and the controller is inoperative.

According to a first aspect of the present invention, there is provided an automatic open-and-close system for a vehicle slide door, comprising: a drive source; a slide door moving mechanism for opening/closing the slide door along a vehicle body; a clutch device for intermittently transmitting a power from the drive source to the slide door moving mechanism; a controller for intermittently controlling the clutch device; and a select circuit for forcibly operating the clutch device when a vehicle engine starts by applying a power source voltage to the clutch device.

In the above automatic open-and-close system, start-up of the vehicle engine is preferably detected by detecting a state that an ignition switch is put at a starter position.

According to a second aspect of the present invention, there is provided an automatic open-and-close system for a vehicle slide door, comprising: a drive source; a slide door moving mechanism for opening/closing the slide door along a vehicle body; a clutch device for intermittently transmitting a power from the drive source to the slide door moving mechanism; a controller for intermittently controlling the clutch device; and a control circuit for forcibly operating the clutch device when a power source voltage applied to the controller drops.

In the automatic open-and-close system according to the above first and second aspects of the present invention, when the power source voltage returns to its normal voltage and the slide door stops at a mid position on a door moving path, the controller operates the clutch device and releases a brake of the drive source for a predetermined time.

In the automatic open-and-close system of the invention, when the ignition switch is set at the starter position, the electromagnetic clutch is forcibly turned on. Therefore, it is possible to prevent the slide door from suddenly opening and closing in a situation that the engine is started up when the slide door is being driven for its opening and closing, the battery voltage drops and the controller is reset.

In a situation that when the slide door is being driven for its opening and closing, the battery voltage drops, and the controller is reset, the electromagnetic clutch is forcibly turned on. Therefore, there is no chance that the slide door suddenly opens or closes.

When the battery voltage is restored to its normal voltage, the electromagnetic clutch is turned on for a predetermined time period and the motor brake is released. When the vehicle stops on the sloped road and the slide door is stopped at the mid position on its moving route, the slide door moves down while being decelerated by the friction of the mechanical section. Therefore, it never happens that the slide door is suddenly opened and closed.

DETAILED DESCRIPTION OF THE PREFERRED EMBODIMENTS

Figure 1:
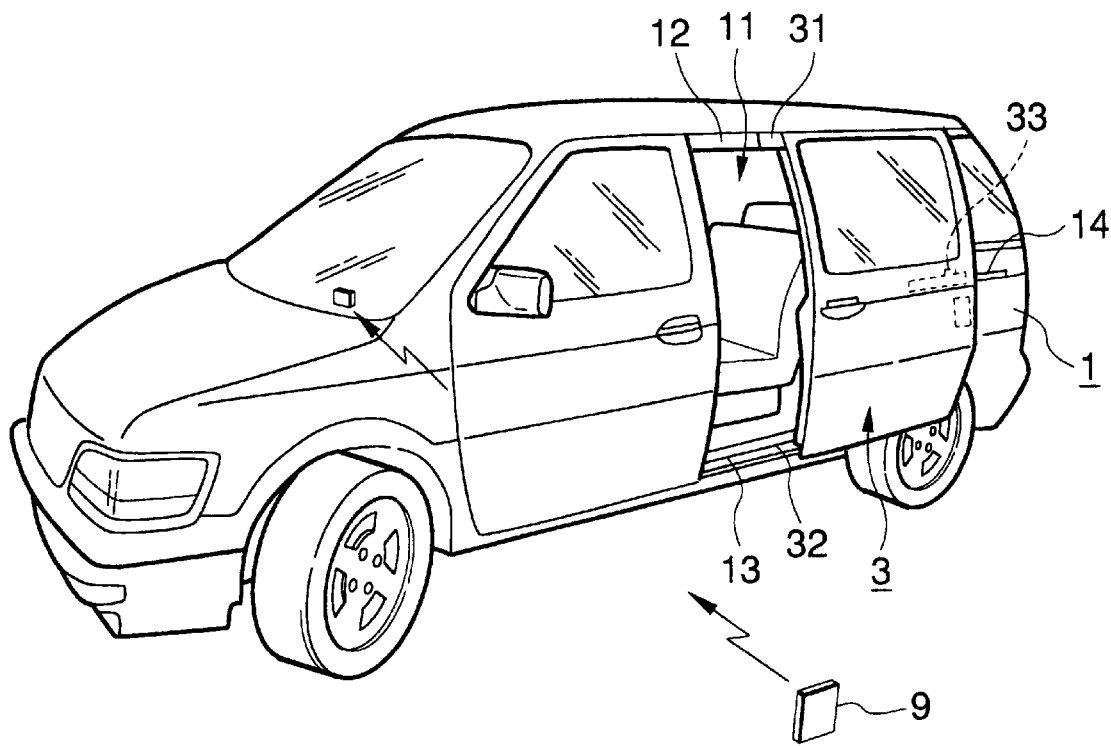
FIG. 1 is a perspective view showing an external appearance of a motor vehicle incorporating an automatic open-and-close system for a vehicle slide door which is constructed according to the present invention.
Figure 2:
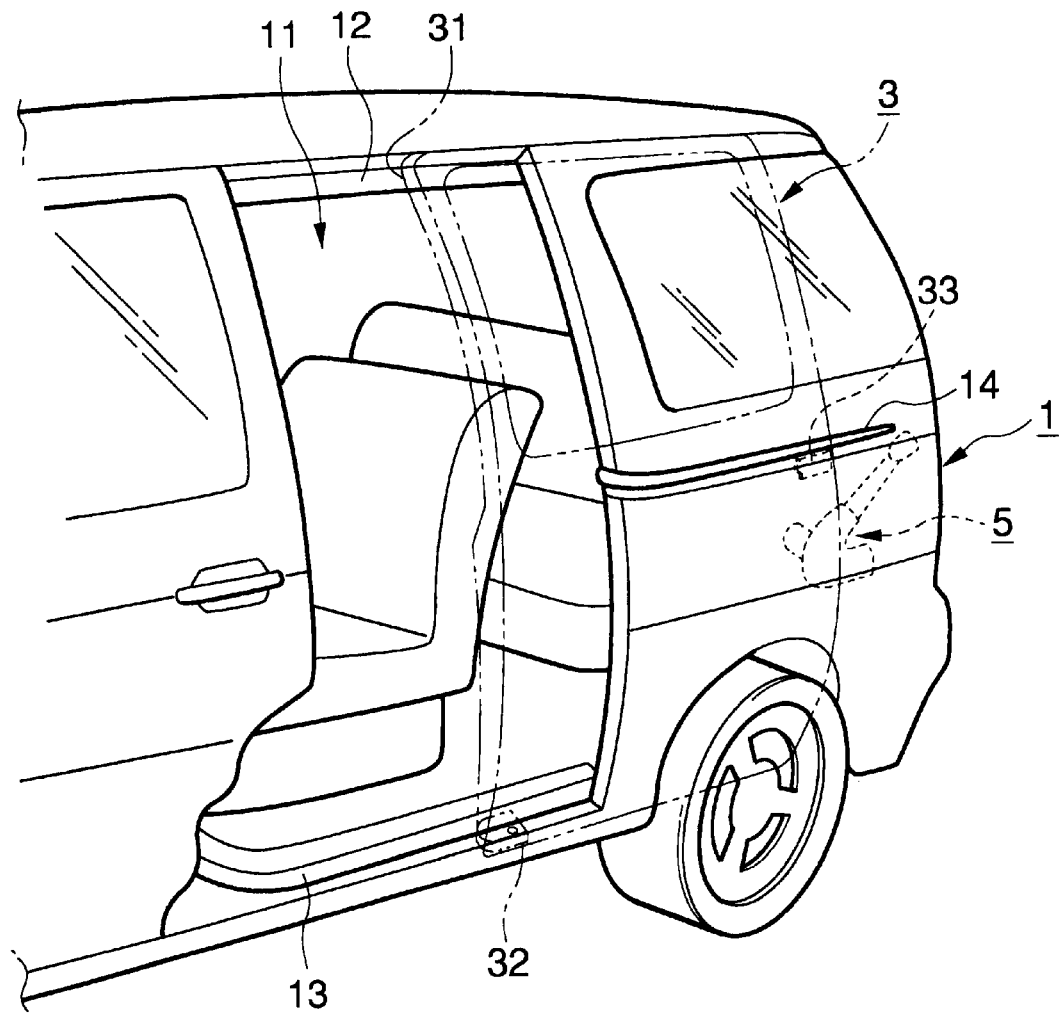
FIG. 2 is an enlarged, perspective view showing a vehicle body when the slide door is removed therefrom.
Figure 3:
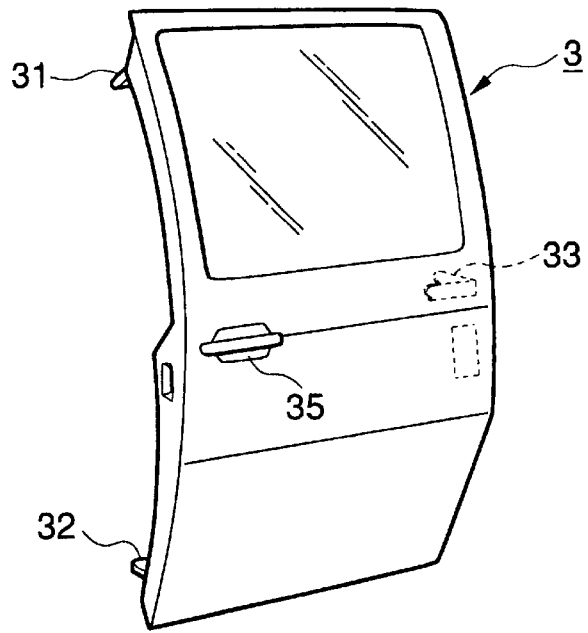
FIG. 3 is a perspective view showing the slide door alone.

FIG. 1 is a perspective view showing an external appearance of a motor vehicle incorporating an automatic open-and-close system for a vehicle slide door which is constructed according to the present invention. As shown, a slide door 3 is mounted on the side of a vehicle body 1 while being longitudinally slidable for its opening and closing. FIG. 2 is an enlarged, perspective view showing the vehicle body 1 when the slide door (indicated by a chain line) is removed. FIG. 3 is a perspective view showing the slide door 3 alone.

In those figures, the slide door 3 is mounted on the vehicle body 1 while being longitudinally slidable in the following way. An upper sliding coupler 31 is fastened on the upper end of the inner side of the slide door 3, and a lower sliding coupler 32 is fastened on the lower end of the door inner side. An upper track 12 is provided along the upper edge of an door opening portion 11 of the vehicle body 1, and a lower track 13 is provided along the lower edge thereof. The upper sliding coupler 31 and the lower sliding coupler 32 are coupled with the upper track 12 and the lower track 13, respectively.

A hinge arm 33 is mounted on the rear end of the inner side of the slide door 3. A guide track 14 is fastened to a portion near the waist of the rear part of the vehicle body 1. The slide door 3 is guided along the guide track 14 in a state that the hinge arm 33 is slidably engaged with the guide track 14. The slide door 3 is moved from a closed position to an open position, while being protruded slightly outward from the outer panel of the vehicle body 1 and in parallel with the outer surface of the outer panel of the vehicle body 1. At the closed position, the door opening portion 11 is tightly closed with the slide door, and at the open position the door opening portion 11 is fully opened. A door handle 35 is mounted on the outer surface of the slide door 3. The door handle is used for manually opening and closing the slide door 3.

Figure 4:
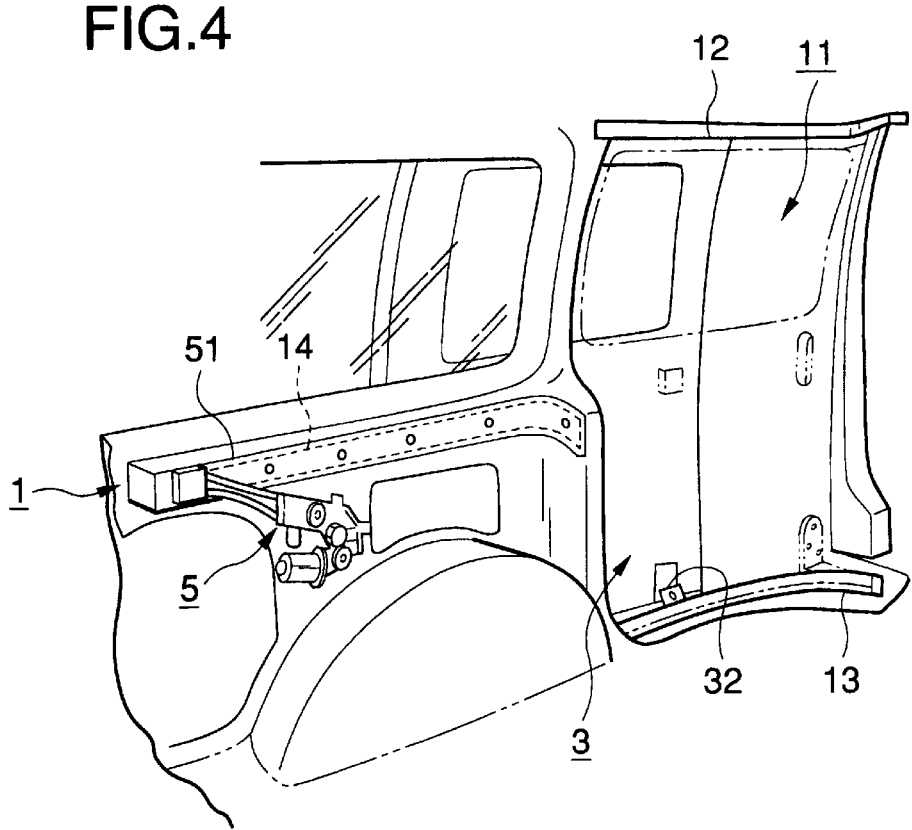
FIG. 4 is a perspective view showing a slide door mounting portion of the vehicle when viewed from the inside of the vehicle.

As shown in FIG. 4, a slide door drive mechanism 5 is provided in a space between the outer and inner panels of the vehicle body 1. The outer panel demarcates the outside of the vehicle body 1, and the inner panel is located within the vehicle. In the slide door drive mechanism 5, a cable 51, which is disposed within the guide track 14, is coupled with the slide door 3 and a motor. In operation, the slide door 3 is moved for its opening and closing by the cable 51, which is moved by the motor.

In the present embodiment, either open/close switches attached to the inside of the vehicle or a wireless remote switch 9 (FIG. 1) is selectively used for generating open and close instructions. The construction for the open/close instruction generation will be described subsequently.

Figure 5:
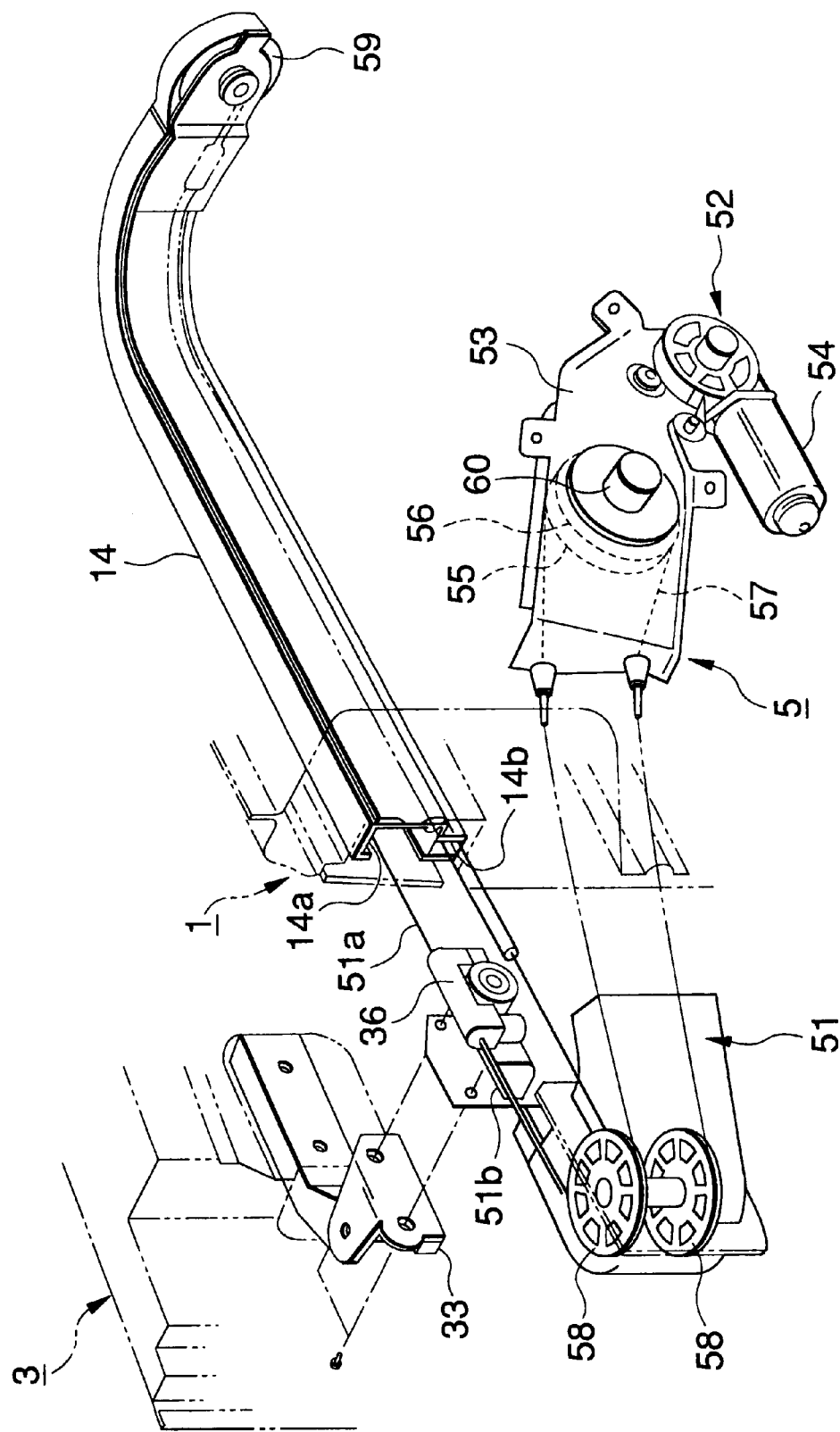
FIG. 5 is a perspective view showing a key portion of a slide door drive mechanism.

FIG. 5 is a perspective view showing a principal portion of a slide door drive mechanism. As shown, the slide door drive mechanism 5 includes a drive means 52. The drive means 52 includes an open/close motor 54, a drive pulley 55, and a reduction means 57, these being all fastened onto a base plate 53 that is fixed to within the vehicle body 1 by means of bolts, for example. The open/close motor 54 is reversible and for opening and closing the slide door. The cable 51 is wound on the drive pulley 55. The reduction means 57 contains an electromagnetic clutch 56 therein.

A pair of guide pulleys 58 are provided on the rear side of the guide track 14. An upper channel 14a and a lower channel 14b are formed in the guide track 14 while being parallel to each other. The upper channel 14a is shaped like U while being opened outward. A reversal pulley 59 is provided at the front end of the guide track 14. The cable 51 is wound at one end around the drive pulley 55 and at the other end around the reversal pulley 59 in an endless fashion. The upper cable of the endless cable 51 is put at the mid point on the guide pulleys 58 and passes through the upper channel 14a of the guide track 14, while the lower cable thereof is put at the mid point on the guide pulleys 58 and passes through the lower channel 14b.

A moving member 36 is secured to an appropriate position of the upper cable of the endless cable 51, which travels through the upper channel 14a of the guide track 14. The moving member 36 is secured so as to secure its smooth travelling through the upper channel 14a. The fore part of the upper cable with respect to the moving member 36 serves as a door-opening cable 51a, while the rear part of the same serves as a door-closing cable 51b.

The moving member 36 is coupled with the rear end of the inner side of the slide door 3 through the hinge arm 33. It is moved forward or backward within the upper channel 14a by a pulling force of the door-opening cable 51a or the door-closing cable 51b to thereby move the slide door 3 in the door closing or opening direction. Thus, the cable 51, guide pulleys 58, reversal pulley 59, hinge arm 33, and the like make up a slide door moving mechanism.

A rotary encoder 60 is coupled with the rotary shaft of the drive pulley 55. The rotary encoder measures a rotation angle of the rotary shaft at a high resolution. With a turn of the drive pulley 55, the rotary encoder 60 generates a pulse signal containing the number of pulses that depends on an rotation angle of the drive pulley 55. The pulse signal represents an amount of the movement of the cable 51 that is wound on the drive pulley 55, viz., an amount of the movement of the slide door 3. The number of pulses that are generated from the rotary encoder 60 are counted over a range from the closed position of the slide door 3 to the open position, by a proper counter (not shown). Then, a count N of the counter represents a current position of the moving member 36, viz., a current position of the slide door 3.

Figure 6:
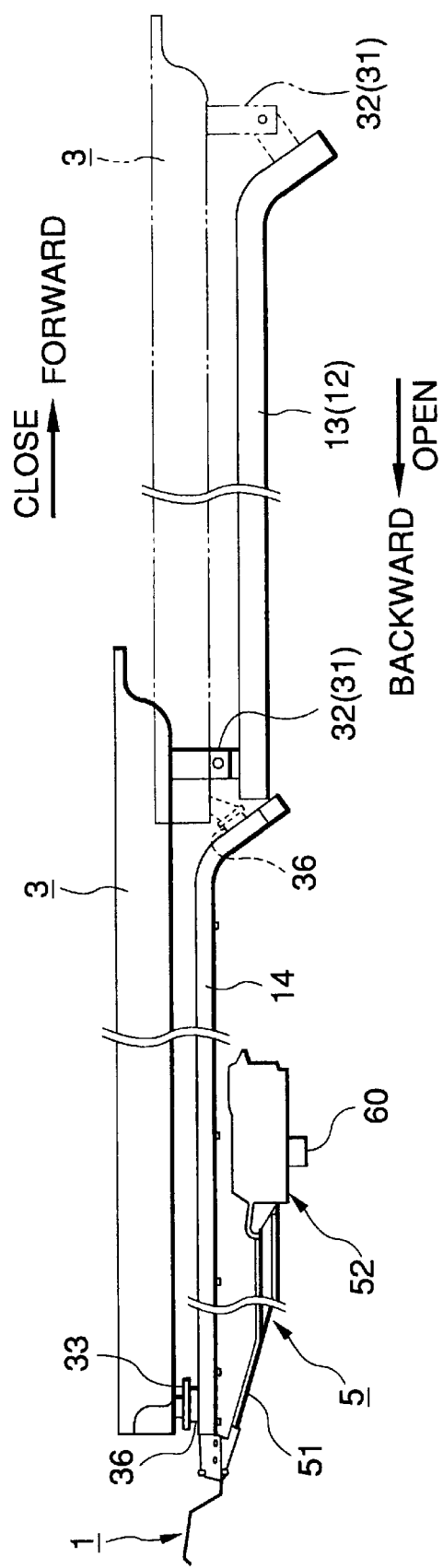
FIG. 6 is a plan view schematically showing a movement of the slide door.

FIG. 6 is a plan view schematically showing a movement of the slide door. As already stated, the upper sliding coupler 31 and the lower sliding coupler 32 are slidably coupled with the upper track 12 and the lower track 13, respectively, to thereby hold the fore part o the slide door 3. The hinge arm 33 is secured to the cable 51 through the moving member 36, to thereby hold the rear part of the slide door 3.

Slide Door Control Unit And Its Peripheral Devices

The electrical connections of a slide door control unit 7 and the electrical components mounted on the vehicle body 1 and the slide door 3 will be described with reference to a block diagram shown in FIG. 7. The slide door control unit 7 is installed, for example, at a location near the drive means 52 in the vehicle body 1. The slide door control unit 7 controls the slide door drive mechanism 5, and uses a program control by a microcomputer for the control.

The electrical connections of the slide door control unit 7 to the electrical components in the vehicle body 1 are: it is connected to a battery 15 to receive a DC voltage BV therefrom, an ignition switch 16 to receive an ignition signal IG, a parking switch 17 to receive a parking signal PK, and a main switch 18 for receiving a main switch signal MA.

Further, the slide door control unit 7 is connected to a door opening switch 19 to receive a door open signal DO therefrom, a door closing switch 20 to receive a door close signal DC, a keyless system 21 to receive a remote open signal RO or a remote close signal RC from the wireless remote switch 9, a buzzer 22 for generating an alarm when the slide door 3 is automatically opened or closed, and a speed sensor 23 to receive a vehicle speed signal SS. The opening switch 19 and the closing switch 20 are each provided with two contacts as shown, for the reason that these switches are mounted at two locations, for example, the driver's seat and the rear seat.

The connections of the slide door control unit 7 to the slide door drive mechanism 5 are the connections for supplying electric power to the open/close motor 54, for controlling the electromagnetic clutch 56, and the connection with the pulse generator 61 which outputs pulse signals $\phi 1$ and $\phi 2$ by receiving pulse signals from the rotary encoder 60.

The slide door control unit 7 are electrically connected to the electrical components in the slide door 3 when the vehicle connector 24 mounted at a position of the door opening portion 11 is connected to the door connector 37 mounted at the opening end of the slide door 3 in a state that the slide door 3 is slightly moved for opening from the closed position.

When the slide door control unit 7 is thus connected to the electrical components in the slide door 3, the following electrical connections are set up: the connection for supplying electrical power to the closure motor (M) 38 to tighten the slide door 3 being in a half-latch state to its full-latch state, the connection for supplying electric power to the actuator (ACTR) 39 to drive a door lock 34 out of a striker 25, the connection for detecting a half-latch to receive a half-latch signal HR from the half-latch switch 40, the connection for receiving a door handle signal DH from a door handle switch 35a to detect an operation of the door handle 35 coupled with the door lock 34, and other connections.

A full-open detect switch 65 is mounted on the lower track 13. When the slide door 3 reaches a full-open position, the full-open detect switch 65 is turned on by the lower sliding coupler 32.

Key Portion Block Diagram of the First Embodiment

Figure 7:
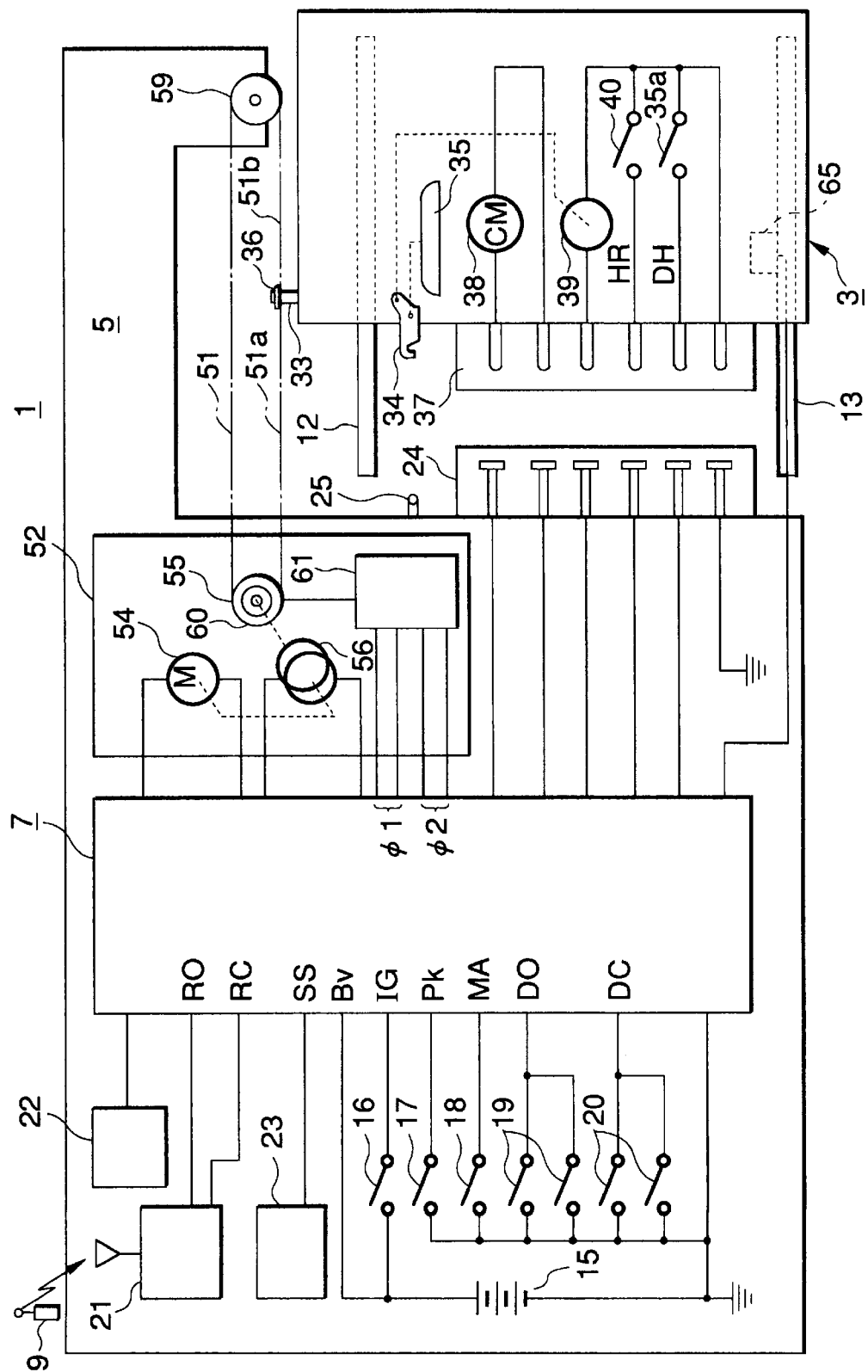
FIG. 7 is a block diagram showing a connection of a slide door control unit and its related electrical components.
Figure 8:
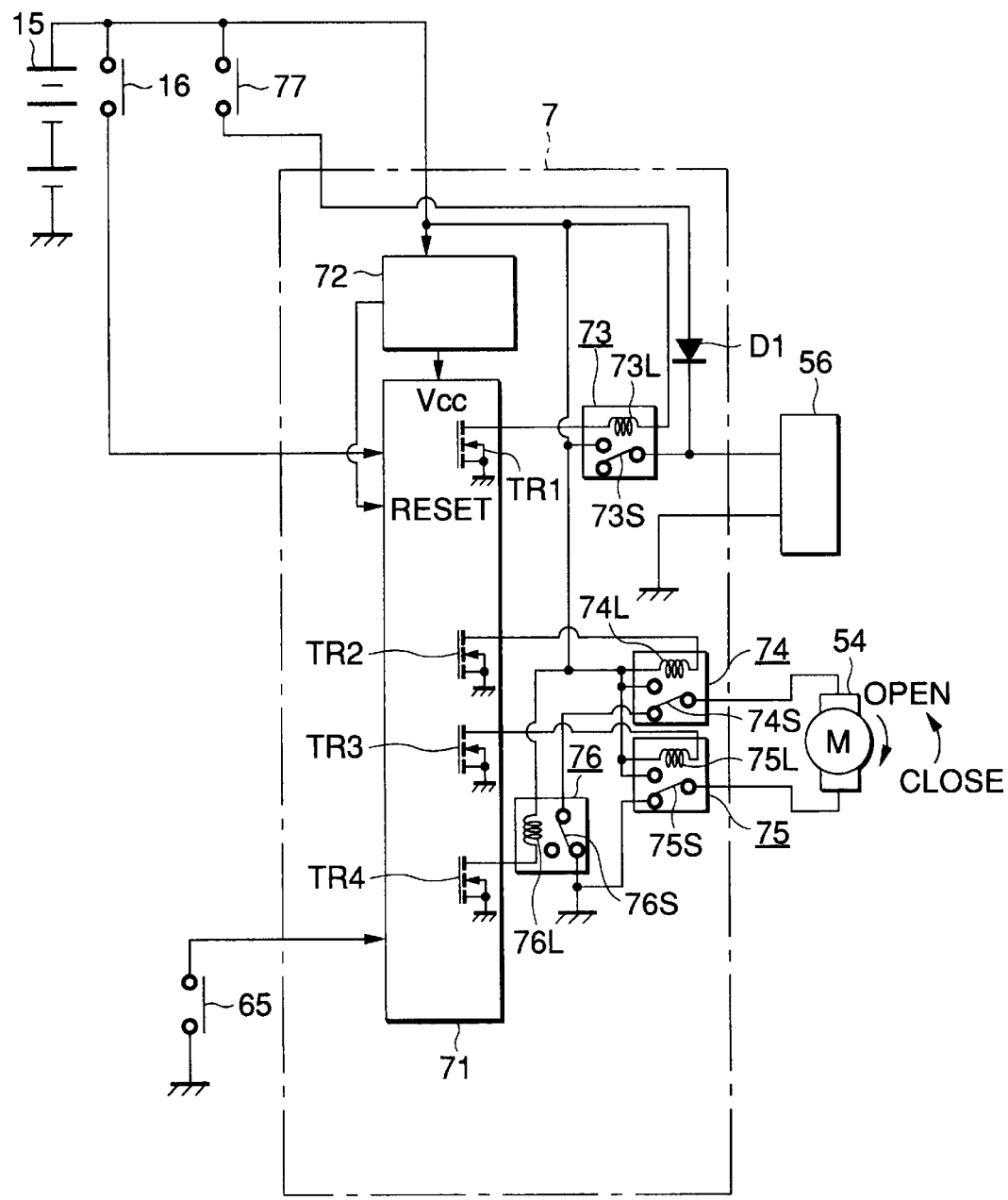
FIG. 8 is a block diagram showing a key portion of an embodiment of the present invention.

FIG. 8 is a block diagram showing the slide door control unit for the electromagnetic clutch in the circuit diagram shown in FIG. 7, the control unit being a key portion of a first embodiment of the invention. In the figure, the slide door control unit 7 includes a controller 71 containing a microcomputer, and repeats its control at fixed time intervals.

The slide door control unit 7 further includes a power-source monitor circuit 72. The power-source monitor circuit 72 receives a power source voltage from the battery 15 and generates a power source voltage Vcc on the basis of the received voltage, and monitors the output voltage of the battery 15.

When the output voltage of the battery 15 drops below a predetermined voltage value, the power-source monitor circuit 72 detects the voltage drop and sends a reset signal to the reset terminal of the controller 71 to stop the operation of the controller 71. There is the possibility that the microcomputer of the controller 71 operates uncontrollably when the battery voltage drops to below the rated voltage. The rated voltage is determined by the type of the microcomputer used, the voltage drop in the power source circuit, or the like. In the present embodiment, the microcomputer of the controller is reset when the battery voltage drops to 6.5V or thereabout (the voltage applied to the microcomputer is about 4V).

The slide door control unit 7 includes a clutch control relay 73 driven by the controller 71. A relay coil 73L of the clutch control relay 73 is connected at one end to a switch element TR1 of the controller 71, and at the other end to the battery 15. A contact switch 73S includes a fixed contact connected to the battery 15 and a movable contact arm connected to one end of the electromagnetic clutch 56. The other end of the electromagnetic clutch 56 is earthed.

The slide door control unit 7 further includes first and second motor control relays 74 and 75. A relay coil 74L of the first motor control relay 74 is connected at one end to a switch element TR2 and at the other end to the battery 15. The movable contact arm of a contact switch 74S of the first motor control relay 74 is connected to one end of the open/close motor 54. One of the fixed contacts of the contact switch 74S is connected to the battery 15, while the other fixed contact is earthed through a contact switch 76S of a motor-brake cancel relay 76.

The second motor control relay 75 includes a relay coil 75L and a contact switch 75S. The relay coil 75L is connected at one end to a switch element TR3 of the controller 71 and at the other end to the battery 15. The contact switch 75S includes a movable contact arm and two fixed contacts. The movable contact arm of the contact switch 75S is connected to the other end of the open/close motor 54, and one of the fixed contacts is connected to the battery 15 while the other fixed contact is earthed.

The slide door control unit 7 includes the motor-brake cancel relay 76 which further includes a relay coil 76L and the contact switch 76S. The relay coil 76L is connected at one end to a switch element TR4 of the controller 71 and at the other end to the battery 15. A movable contact arm of the contact switch 76S is connected to the other fixed contact of the first motor control relay 74, and a fixed contact of the same is earthed.

The output terminal of the battery 15 is connected to the controller 71 through an ignition switch 16, and to one end of the electromagnetic clutch 56 through a series circuit including a starter position switch 77 and a diode D1.

In the thus arranged circuitry, when the opening switch 19 is turned on, the switch element TR1 is turned on to allow current to flow to the relay coil 73L of the clutch control relay 73, and then the contact switch 73S is closed. Upon the closing of the contact switch 73S, one end of the electromagnetic clutch 56 is connected to the battery 15. At this time, the electromagnetic clutch 56 changes its state from an off state to an on state since the other end of the clutch is earthed.

Then, the switch element TR2 is turned on and current flows into the relay coil 74L of the first motor control relay 74 to thereby close the contact switch 74S. When the contact switch 74S is closed, the open/close motor 54 of which the other end is earthed is connected at one end to the battery 15, and is driven to turn in the opening direction of the slide door 3. A power is transmitted from the open/close motor 54 through the electromagnetic clutch 56 and the drive pulley 55 to the cable 51, and the slide door 3 is moved in the opening direction.

When the door closing switch 20 is turned on, the switch element TR1 is turned on, the electromagnetic clutch 56 is put in an on state, and in turn the switch element TR3 is turned on. Current flows into the relay coil 75L of the second motor control relay 75, the contact switch 75S is closed, and the other end of the open/close motor 54 is connected to the battery 15.

One end of the open/close motor 54 is earthed through the first motor control relay 74 and the motor-brake cancel relay 76. Therefore, the open/close motor 54 is turned in the closing direction of the slide door 3. A power is transmitted from the open/close motor 54 through the electromagnetic clutch 56 and the drive pulley 55 to the cable 51, and the slide door 3 is moved in the closing direction.

During the movement of the slide door 3, if the vehicle engine is started up, the ignition switch is set at the starter position, the starter position switch 77 is turned on, and the output voltage of the battery 15 is applied to one end of the electromagnetic clutch 56 by way of the diode D1.

The reason why the battery voltage is directly applied to the electromagnetic clutch 56 in the above situation follows. As described above, where the battery performances are degraded, if the starter motor of which the capacity is the largest of the vehicle-carried transfer loads is driven, the battery voltage drops. In turn, the controller 71 is reset to stop the supply of electric power through the clutch control relay 73 to the electromagnetic clutch 56. The electromagnetic clutch 56 is inoperative. At this time, if the vehicle stops on the sloped road, the slide door will move down by its weight. To avoid this, the power source voltage must be supplied to the electromagnetic clutch 56. It is for this reason that the battery voltage is directly applied to the electromagnetic clutch 56.

The lowest voltage of the weakened battery 15 is about 4V when the engine is started. At this value of the battery voltage, the microcomputer of the controller 71 is reset. However, it is noted that the electromagnetic clutch 56 is operative at 3.5V or thereabout of the battery voltage, and that the electromagnetic clutch 56, once operated, keeps its on state because of its hysteresis characteristic even if the battery voltage further drops. In a state the controller 71 is reset, the open/close motor 54 is standstill, and the slide door 3 stops. The result is that the slide door 3 will not move by its weight.

The diode D1 prevents current from flowing into, for example, the starter motor connected to the starter position when the ignition switch is set at the starter position.

When the engine starts and the battery voltage is restored to the normal voltage, then the controller 71 is restored to its normal operation state. When the full-open detect switch 65, which will be turned on when the slide door 3 is at the full-open position, is in an off state and the half-latch switch 40 is also in an off state, that is, when the slide door 3 is present at the mid position on its moving path, the controller 71 turns on the switch element TR1, and the electromagnetic clutch 56 for a predetermined period of time. Further, it turns on the switch element TR4, and the motorbrake cancel relay 76 for a predetermined time period. When the motor-brake cancel relay 76 is turned on, the brake of the open/close motor 54 is released.

In the vehicle using such a control for the automatic open-and-close system, when the vehicle stops on the sloped road and the slide door 3 is stopped at the mid position on its moving route, the slide door 3 moves down while being decelerated by the friction of the mechanical section (particularly drive source gears). Therefore, there is no chance that the slide door 3 is suddenly opened and closed. Further, the slide door 3 may be manually opened and closed.

Key Portion Block Diagram of the Second Embodiment

Figure 9:
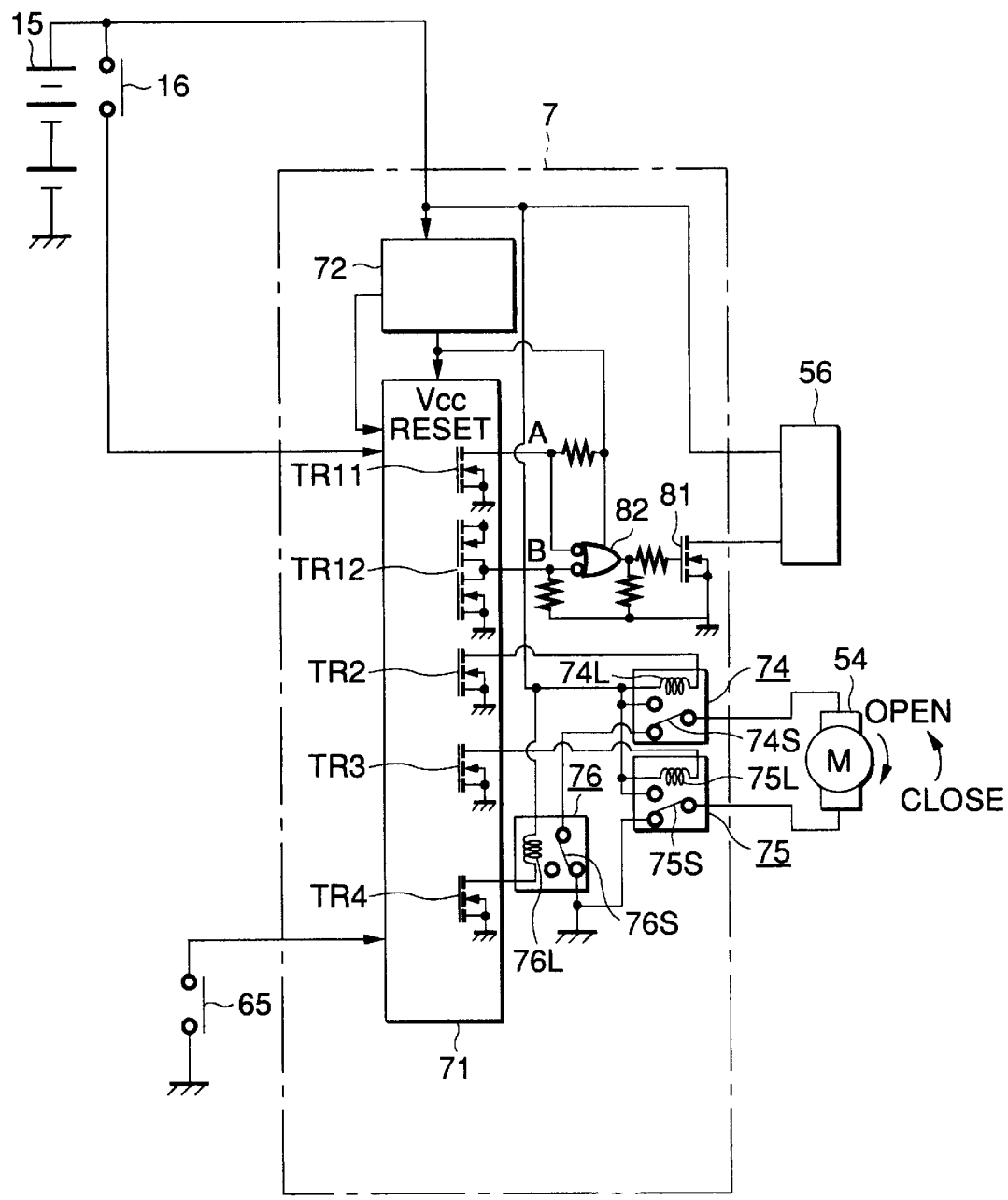
FIG. 9 is a block diagram showing a key portion of another embodiment of the present invention.

FIG. 9 is a block diagram showing the slide door control unit for the electromagnetic clutch in the circuit diagram, the control unit being a key portion of another embodiment of the invention. Like reference numerals are used for designating like or equivalent portions in FIG. 8, for simplicity.

In the present embodiment, the series circuit including the starter position switch 77 and the diode D1, and the clutch control relay 73 are not used in the slide door control unit. Instead of the removal of the series circuit and the relay, one end of the electromagnetic clutch 56 is connected to the battery 15, and the other end thereof is earthed through a switch element 81 in the slide door control unit 7.

The switch element 81 is controlled by an NAND circuit 82 which NANDs the output A of a switch element TR11 and the output B of a switch element TR12 in the controller 71. The remaining arrangement of the FIG. 9 embodiment is substantially the same as of the FIG. 8 embodiment.

In FIG. 9, in a normal operation (6.5V or higher of the battery voltage), the switch element TR12 is so controlled as to constantly produce an output B of "H" level since the microcomputer of the controller 71 normally operates. Therefore, the output of the NAND circuit 82 becomes an inversion value of the output A, and it is possible to control the switch element 81 by the controller 71.

If the output A of the switch element TR11 goes high ("H"), the switch element 81 is turned off, and the electromagnetic clutch 56 is also turned off. If the output A goes low ("L"), the switch element 81 is turned on and the electromagnetic clutch 56 is also turned on.

When the battery voltage drops to below 6.5V, the power-source monitor circuit 72 produces a reset signal for transmission to the controller 71, and the controller is reset. In turn, the output B is open but is set in an "L" state by the pull-down resistor. Therefore, the output of the NAND circuit 82 is in an "H" state irrespective of a logical state of the output A of the switch element TR11, and the switch element 81 is turned on and the electromagnetic clutch 56 is also turned on.

At this time, the open/close motor 54 is standstill as the result of the resetting of the microcomputer of the controller 71. Then, the slide door 3 also stops, and it is not moved by its weight. Thus, the NAND circuit 82 serves also as a control circuit to forcibly turn on the electromagnetic clutch 56 when the battery voltage drops.

When the battery is restored to have a normal voltage and the controller 71 is operated, the output B also resumes an "H" state. If the electromagnetic clutch 56 and the motor-brake cancel relay 76 are put in an on state for a predetermined time period when the battery voltage is restored to its normal voltage, it is possible to prevent the slide door 3 from suddenly opening and closing as in the previous embodiment.

In the automatic open-and-close system of the invention, when the ignition switch is set at the starter position, the electromagnetic clutch is forcibly turned on. Therefore, it is possible to prevent the slide door from suddenly opening and closing in a situation that the engine is started up when the slide door is being driven for its opening and closing, the battery voltage drops and the controller is reset.

In a situation that when the slide door is being driven for its opening and closing, the battery voltage drops by the starting of the engine or another cause, and the controller is reset, the electromagnetic clutch is forcibly turned on. Therefore, there is no chance that the slide door suddenly opens or closes.

When the battery voltage is restored to its normal voltage, the electromagnetic clutch is turned on for a predetermined time period and the motor brake is released. When the vehicle stops on the sloped road and the slide door is stopped at the mid position on its moving route, the slide door moves down while being decelerated by the friction of the mechanical section. Therefore, it never happens that the slide door 3 is suddenly opened and closed.

What is claimed is:

1. An automatic open-and-close system for a vehicle slide door, comprising:

a drive source;

a slide door moving mechanism for opening/closing the slide door along a vehicle body;

a clutch device for intermittently transmitting a power from said drive source to said slide door moving mechanism;

a controller for intermittently controlling said clutch device; and a select circuit for forcibly operating said clutch device when a vehicle engine starts by applying a power source voltage to said clutch device.

2. The automatic open-and-close system according to claim 1, wherein start-up of the vehicle engine is detected by detecting a state that an ignition switch is put at a starter position.

3. The automatic open-and-close system according to claim 1, wherein, when the power source voltage returns to its normal voltage and the slide door stops at a mid position on a door moving path, said controller operates said clutch device and releases a brake of said drive source for a predetermined time.

4. An automatic open-and-close system for a vehicle slide door, comprising:

a drive source;

a slide door moving mechanism for opening/closing the slide door along a vehicle body;

a clutch device for intermittently transmitting a power from said drive source to said slide door moving mechanism;

a controller for intermittently controlling said clutch device; and a control circuit for forcibly operating said clutch device when a power source voltage applied to said controller drops.

5. The automatic open-and-close system according to claim 4, wherein, when the power source voltage returns to its normal voltage and the slide door stops at a mid position on a door moving path, said controller operates said clutch device and releases a brake of said drive source for a predetermined time.

6. An automatic open-and-close system for a vehicle slide door, comprising:

a drive source;

means for opening/closing the slide door along a vehicle body;

means for intermittently transmitting power from said drive source to said opening/closing means;

means for controlling said transmitting means; and means for forcibly operating said transmitting means when the drive source voltage applied to said controlling means drops.

7. The automatic open-and-close system according to claim 6, wherein, when a vehicle engine starts, said operating means applies the power source voltage to said transmitting means so as to forcibly operate said transmitting means.

8. The automatic open-and-close system according to claim 7, wherein start-up of the vehicle engine is detected by detecting a state that an ignition switch is put at a starter position.

9. The automatic open-and-close system according to claim 6, wherein, when the power source voltage returns to its normal voltage and the slide door stops at a mid position on a door moving path, said controlling means operates said transmitting means and releases a brake of said drive source for a predetermined time.

* * * * *